US010059071B2

(12) United States Patent
Rammig

(10) Patent No.: US 10,059,071 B2
(45) Date of Patent: Aug. 28, 2018

(54) METHOD FOR MANUFACTURING AN UPPER FOR A SHOE

(71) Applicant: adidas AG, Herzogenaurach (DE)

(72) Inventor: Erwin Rammig, Herzogenaurach (DE)

(73) Assignee: adidas AG, Herzogenaurach (DE)

( * ) Notice: Subject to any disclaimer, the term of this patent is extended or adjusted under 35 U.S.C. 154(b) by 542 days.

(21) Appl. No.: 13/873,973

(22) Filed: Apr. 30, 2013

(65) Prior Publication Data

US 2013/0291400 A1 Nov. 7, 2013

(30) Foreign Application Priority Data

May 2, 2012 (DE) .......................... 10 2012 207 300

(51) Int. Cl.
*B29D 35/12* (2010.01)
*B29D 35/14* (2010.01)
(Continued)

(52) U.S. Cl.
CPC ............ *B29D 35/146* (2013.01); *A43B 5/025* (2013.01); *A43B 23/026* (2013.01);
(Continued)

(58) Field of Classification Search
CPC . A43B 5/025; A43B 23/0235; A43B 23/0255; A43B 23/026; A43B 23/0245; A43B 23/0295; B29D 35/146; B29D 35/0054; B29D 35/0063; B29D 35/0072; B29D 35/0081; B29D 35/009; B29D 35/065; B29D 35/067; B29D 35/068; B29D 35/085; B29D 35/087; B29D 35/088; B29D 35/126
(Continued)

(56) References Cited

U.S. PATENT DOCUMENTS 2,805,182 A * 9/1957 Hallenbeck ............. B32B 27/00
152/564
3,042,975 A * 7/1962 Bingham, Jr. ........... A43B 9/04
12/142 E
(Continued)

FOREIGN PATENT DOCUMENTS

CN 2296643 11/1998
CN 101001903 7/2007
(Continued)

OTHER PUBLICATIONS

Japanese Patent Application No. 2013-96269, Office Action dated Jul. 28, 2015, 4 pages (No English translation available. A summary of the Office Action is provided in the Transmittal Letter submitted herewith).

(Continued)

*Primary Examiner* — John Goff

(74) *Attorney, Agent, or Firm* — Kilpatrick Townsend & Stockton LLP

(57) ABSTRACT

Methods for manufacturing an upper for a shoe, in particular a football shoe, are described. A base layer for an upper is provided. At least one profile element, which comprises a rubber material, is connected to the outer face of the base layer. The profile element is connected to the outer face of the base layer without using a seam by means of hot pressing.

18 Claims, 5 Drawing Sheets

(51) Int. Cl.
*A43B 5/02* (2006.01)
*A43B 23/02* (2006.01)
*B29D 35/00* (2010.01)

(52) U.S. Cl.
CPC ...... *A43B 23/0235* (2013.01); *A43B 23/0245* (2013.01); *A43B 23/0255* (2013.01); *B29D 35/0054* (2013.01)

(58) Field of Classification Search
USPC ............... 36/132, 136, 114, 128; 12/146 C; 156/322
See application file for complete search history.

(56) References Cited

U.S. PATENT DOCUMENTS

| | | | | |
|---|---|---|---|---|
| 3,255,491 | A * | 6/1966 | Hardy | B29D 35/0009 12/33.2 |
| 4,072,461 | A * | 2/1978 | Pirk | A43B 13/20 425/119 |
| 4,447,967 | A | 5/1984 | Zaino | |
| 5,093,379 | A * | 3/1992 | Tiao | C08G 18/165 36/114 |
| 5,743,027 | A * | 4/1998 | Barma | A43B 1/10 12/142 D |
| 6,082,023 | A * | 7/2000 | Dalton | A43B 13/12 36/103 |
| 6,735,886 | B2 * | 5/2004 | Kang | A43B 5/02 36/114 |
| 8,747,711 | B1 * | 6/2014 | Hausmann | B29C 44/06 264/45.1 |
| 2004/0168348 | A1 * | 9/2004 | Strickland | A43B 9/04 36/19.5 |
| 2007/0186445 | A1 * | 8/2007 | Gratadour | A43B 7/144 36/28 |
| 2008/0250668 | A1 * | 10/2008 | Marvin | A43B 9/12 36/54 |
| 2009/0090031 | A1 * | 4/2009 | Jung | A43B 13/14 36/59 C |
| 2012/0066931 | A1 | 3/2012 | Dojan et al. | |
| 2012/0260437 | A1 * | 10/2012 | Shiue | A43B 13/04 12/146 B |

FOREIGN PATENT DOCUMENTS

| | | | |
|---|---|---|---|
| CN | 201001430 | 1/2008 | |
| CN | 102160699 | 8/2011 | |
| DE | 1902266 | 7/1970 | |
| DE | 2801984 | 7/1979 | |
| EP | 0496931 | 8/1992 | |
| GB | 940925 | 11/1963 | |
| GB | 2259639 | 3/1993 | |
| JP | 01310601 | 12/1989 | |
| JP | 08332101 | 12/1996 | |
| JP | 09028412 | 2/1997 | |
| JP | 4351700 | 10/2009 | |
| WO | WO 83/03339 | 10/1983 | |
| WO | WO 2001/078540 | 10/2001 | |
| WO | WO 2002/054898 | 7/2002 | |
| WO | WO 2004/093588 | 11/2004 | |
| WO | WO 2011020757 A2 * | 2/2011 | A43B 13/04 |

OTHER PUBLICATIONS

Chinese Patent Application No. 2012101529766, First Office Action dated Dec. 3, 2014, 8 pages (English summary of the Office Action included in the accompanying Transmittal Letter).
European Patent Application No. 13165569.8, European Search Report dated Sep. 6, 2013, 5 pages.
Japanese Patent Application No. 2013-096269, Office Action dated Jul. 5, 2016, 3 pages (No English translation available. A Summary of the Office Action is provided in the Transmittal Letter submitted herewith).
German Application No. 102012207300.0, Office Action dated Jan. 27, 2017, 8 pages (No English translation available. A summary of the Office Action is provided in the Transmittal Letter submitted herewith).

* cited by examiner

METHOD FOR MANUFACTURING AN UPPER FOR A SHOE

CROSS REFERENCE TO RELATED APPLICATION

This application is related to and claims priority benefits from German Patent Application No. DE 10 2012 207300.0, filed on May 2, 2012, entitled METHOD FOR MANUFACTURING AN UPPER FOR A SHOE ("the '300 application"). The '300 application is hereby incorporated herein in its entirety by this reference.

FIELD OF THE INVENTION

The present invention relates to methods for manufacturing an upper for shoes, in particular for football shoes.

BACKGROUND

Football shoes provide a variety of functions that are specifically adapted to the needs of football. A particularly important function of a football shoe is to provide a good grip between the upper of the shoe and a ball. By means of an increased grip of the ball at the upper, an improved control of the ball may be achieved.

By means of the increased grip, the ball may be provided with a particular spin when shooting, passing or free-kicking which allows specific trajectories of the ball. The greater the grip of the ball by the upper, the more spin that can be transferred to the ball.

In addition, an increased grip of the ball at the upper may also be advantageous for dribbling. In particular, it may allow the ball to follow fast movements of a foot more easily and it may allow a more precise ball control by the foot since the ball is prevented from sliding off the upper. In particular, in wet conditions, such an increased grip between ball and upper is desirable.

Usually, football players use specific areas of the upper of a football shoe for different types of contact with the ball, for which correspondingly varying degrees of grip are desirable. Therefore, the different areas of a football shoe should be provided with different grip properties.

Various football shoes are known in the prior art which provide an upper with locally increased grip. To this end, the upper of the shoe is typically equipped with a particular profile or with particular profile elements.

In this context, it turned out that rubber is particularly suited for profile elements to provide an increased grip between the upper of a football shoe and a football. Rubber enables a considerably better grip than other materials, as for example thermoplastic polyurethane ("TPU"). The grip properties of rubber, in addition, are also substantially maintained in wet conditions.

A football shoe comprising an area of the upper which is adapted for an improved ball control is known from document WO 2001/078540. This area provides an improved elasticity and grip. The increased grip is provided by a plurality of flat rubber elements, which are sewn to an elastic material which provides the increased elasticity. Alternatively, they are chemically bonded to the latter.

Also from document WO 2004/093588, a football shoe comprising an area of the upper that is provided for an increased ball control is known. The area comprises rubber elements which are attached to the area. Alternatively, the rubber elements may be removably attached to the upper or integrally formed with the upper.

From document WO 2002/054898, rubber elements are known that are attached to an inner layer of the upper and that are subsequently sewn to an outer layer of the upper. According to WO 2002/054898, alternatively, it would be advantageous to attach the rubber elements to a fabric, which may then be attached to the upper.

The sewing of a profile element, which is known from the specified prior art documents in multiple ways, is very labor-intensive and, in addition, only allows for large elements. Moreover, a seam may lead to pressure marks on the foot. Also, attaching profile elements to a fabric, which is subsequently attached to an upper, is very cumbersome. Moreover, the additional use of fabric unnecessarily increases the weight and the cost of the shoe. An integral design of the elements and the upper leads to the disadvantage that the materials that are used for the upper and the individual elements, respectively, cannot be independently optimized. Typically, it is desirable that the materials of the upper comprise different properties than the profile elements. For example, materials for the upper should be breathable and abrasion-resistant.

All cited documents, additionally, have the collective disadvantage that without sewing a sufficiently strong connection between the profile elements and the upper, which may resist the large forces that occur at the upper of the shoe when playing football, may not be achieved. If the profile elements are only glued to the upper, they will fall off very quickly and, therefore, the increased grip of the upper is lost very quickly.

From document GB 940,925, it is known that a rubber layer with protrusions may be arranged within an upper of a football shoe, wherein the upper provides openings at the positions of the protrusions, through which the protrusions may extend. However, this requires a continuous layer of rubber, which reduces the breathability of the upper and also unnecessarily increases the weight and material costs of the upper.

As a result, the methods known in the prior art that may be used for connecting profile elements comprising rubber material to an upper for a shoe, in particular a football shoe, are limited. Sewing is labor-intensive and therefore expensive. In addition, it restricts the design freedom, as well as the functionality of the profile elements, since these have to comprise a specific minimum size such that they may be sewn. The alternative methods for attaching do not allow a sufficiently strong connection of profile elements comprising rubber material.

From document U.S. Pat. No. 4,447,967, a method is known in which plastic material is directly injected onto an upper, in order to strengthen the upper. When compared to rubber material, however, only very weak grip may be obtained from the use of such materials, which is particularly weak in wet conditions.

Document CN 22 96 643 Y discloses a pair of rubber-faced sports shoes, wherein rubber sheets with concave and convex colloidal particles are fixed to the upper surfaces of sports shoes, and may be pasted on the front ends of the sports shoes by hot pressing or glue.

Document WO 83/03339 A1 discloses an item of footwear having an upper provided with an external area of an elastomeric material. The elastomeric material is a soft or synthetic rubber, may be a smooth or non-smooth (e.g. dimpled) surface, and may be affixed to the footwear item by adhesive or by vulcanizing.

Document DE 1 902 266 A discloses a football shoe coated entirely with a rubber layer having a patterned surface. The upper is manufactured by inserting into a forming device that is covered with a raw rubber compound. The material is vulcanized in a closed manner by means of a pressing plate with a patterned surface.

Document GB 2 259 639 A discloses an article of footwear, e.g. a football boot, having at least one region/zone at which frictional interaction during contact between a ball and the region/zone is enhanced. The regions/zones can be provided by attaching a panel of a material comprising a backing layer that to be secured by suitable adhesive, stitching etc.

Document US 2012/0066931 A1 discloses a bonded mesh composite panel that can be used to form a three-dimensional upper shell that includes extensions used for double-lasting and/or to provide a shelf to support foam padding, e.g. a midsole.

Document EP 0496 931 A1 discloses a covering element applicable to items of footwear for soccer, which comprises a body made of a substantially elastic material that defines a cavity for the insertion at least of the front portion of a soccer shoe.

It is therefore desirable to provide an improved method for manufacturing an upper for a shoe, in particular a football shoe, which comprises good grip properties.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

In some embodiments, an object of the present invention is solved by a method for manufacturing an upper for a shoe, in particular a football shoe. A base layer is provided for the upper. At least one profile element that comprises a rubber material is connected to the outer face of the base layer. Therein, the profile element is connected to the outer face of the base layer without using a seam by means of hot pressing.

By means of this method, shoes may be provided with profile elements comprising rubber material without having to sew the profile elements.

Thus, shoes with improved grip may be manufactured efficiently and in an automated manner. In addition, the method allows a multitude of design possibilities for the profile elements and thus a large degree of design freedom. In particular, profile elements which are particularly thin and comprise small areas may be connected to the upper. Thus, the weight of the shoe may be reduced and at the same time the grip of the shoe may be varied precisely and with a particularly fine locally varying structure. This way, in different areas of the upper of the shoe, profile elements with locally differing geometries, material properties, colors, thicknesses etc., may be connected to the upper. Thus, improved grip properties may be provided.

The present invention is based on the insight that, by means of using a suitable hot pressing method, a rubber material may be permanently and reliably connected to an upper.

In certain embodiments, the hot pressing is carried out such that the rubber material vulcanizes on the exterior face of the base layer. By means of the vulcanization of the rubber material, an extremely reliable connection is created between the profile element and the base layer that is strong enough to permanently resist the large forces that arise at the upper of a football shoe.

In certain embodiments, the outer face of the base layer comprises a synthetic material. Thus, the hot pressing method may be combined with a material that is optimized concerning the properties of the upper. Synthetic material is particularly light and flexible but still provides the strength which is required for an upper.

According to some embodiments, the outer face of the base layer comprises polyurethane ("PU"). PU is particularly suited for a connection to a profile element according to the described methods. By means of an outer face of the base layer that comprises PU, profile elements may be connected to the base layer strongly and permanently.

In some embodiments, the rubber material comprises a Shore-A hardness in the range of 30-70. This range is particularly suited for being used in a profile element for a football shoe. On the one hand, a convenient wearing comfort may be achieved since the profile element does not stiffen the upper too strongly. In addition, the profile element is elastic enough such that even for a large force transmission, e.g. for a powerful shot, no pressure marks are created on the foot. On the other hand, it has turned out that the grip properties of the rubber material in this hardness range are also very well suited for a profile element and provide a strong grip. Moreover, the rubber material in this hardness range may be well-connected to the base material by means of suitable hot pressing.

According to certain embodiments, the rubber material comprises a Shore-A hardness in the range of 40-60.

An upper may comprise a first profile element with a Shore-A hardness of approximately 45 and a second profile element with a Shore-A hardness of approximately 55. Thus, profile elements with different hardnesses may be provided in different areas of the upper. These may be adapted to the typical forces that arise at the upper. In addition, an adaptation to the different functionalities of these areas may be carried out. For example, the hardness can be selected to be higher if the area is to be used for powerful kicks. For areas in which the ball is to be stopped or guided at the upper, the hardness can be selected to be lower such that an increased cushioning is provided.

In some embodiments, the hot pressing is carried out in the range of 100° C.-180° C., and may further be carried out in the range of 145° C.-150° C. By means of a hot pressing in this temperature range, an extremely reliable connection between the profile element and the base layer is provided. The temperature may be chosen such that it leads to a vulcanization of the rubber material.

In certain embodiments, the method comprises the step of pre-vulcanizing the profile element prior to connecting it to the base layer. By means of the pre-vulcanization, a profile element is provided which is suited for being connected to the base layer by means of hot pressing and a full vulcanization associated therewith.

According to some embodiments, the method comprises the step of pre-heating the profile element prior to the pre-vulcanization. By means of a pre-heating prior to the pre-vulcanization, an improved material structure of the profile element may be obtained.

In certain embodiments, the method additionally comprises the step of roughening the surface of the profile element prior to the connecting to the base layer. Thus, it is ensured that the surface area of the profile element that may be used for the connection is maximized. Hence, even stronger connections may be obtained.

In some embodiments, the method further comprises the step of coating the surface of the profile element with a primer. Thus, the surface of the profile element is activated. That way, the connection of the profile element to the base layer is further improved.

In certain embodiments, the method further comprises the step of coating the surface of the profile element made from rubber with a gluing means. By using the gluing means, the profile element is additionally glued to the base material in the hot pressing step. A gluing means which is suitable for the hot pressing step enables an additionally improved connection between profile element and base layer.

In some embodiments, the method further comprises the step of cold pressing the base layer and the profile element after the hot pressing. By means of the additional cold pressing, it is ensured that the unit of base layer and profile element is cooled under pressure. Thus, the connection between the profile element and the base layer may be further strengthened.

According to some embodiments, substantially an entire upper of the shoe is formed by the base layer. By means of the method, a profile element may thus be arranged at an arbitrary position of the upper. Hence, a variety of design possibilities for arranging the profile element may be obtained. In addition, connecting several partial areas for an upper after connecting the base layer to the profile element is unnecessary because the base layer may be directly formed into an upper, as well as processed further.

In certain embodiments, the outer face of the base layer is substantially provided for forming the outer face of the upper of the shoe. The method, by means of hot pressing, allows profile elements to be connected to a base layer in a manner that is suitable for forming the outer face of an upper. Further, arranging an outer layer is not necessary, resulting in a lighter and more material-saving shoe.

In some embodiments, the profile element comprises a thickness of less than 1.5 mm. The method also enables strong connections to the base layer for very thin profile elements. Thus, the weight and the material costs for the shoe may be minimized without limiting its functionality.

According to some embodiments, the profile element, in at least one direction, comprises a width of less than 5 mm. Thus, profile elements with very small areas may be connected to the base layer. Hence, the grip of the upper may be adapted particularly precisely. In addition, rubber material may be saved since it is only arranged in areas where it is actually needed.

In other embodiments, an upper for a shoe, in particular a football shoe, or a shoe, in particular a football shoe, comprising an upper is provided, which has been manufactured according to one of the explained methods. Thus, an improved, more cost-effective and lighter upper and shoe, respectively, with an increased grip between the ball and the shoe, may be provided.

BRIEF DESCRIPTION OF THE DRAWINGS

In the following detailed description, embodiments of the invention are described referring to the following figures.

DETAILED DESCRIPTION

Figure 1A:
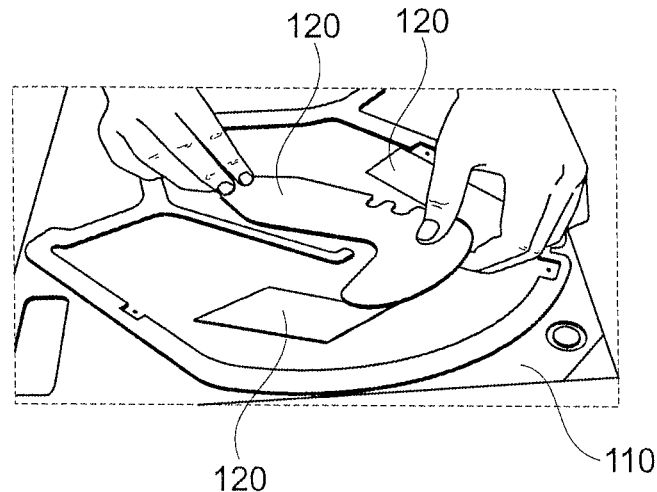
FIGS. 1a-e are perspective views illustrating a method of providing one or more profile elements according to certain embodiments of the present invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

In the following detailed description, certain embodiments of the invention are described with reference to football shoes. The term football shoe also includes other shoes that are configured for contact with a ball, for example rugby shoes or indoor football shoes. However, it is noted that embodiments of the invention are not restricted to these embodiments. The explained aspects may also be applied to other sports shoes for which an increased grip in the region of the upper is desirable, for example skateboard shoes or climbing shoes. Moreover, these aspects may also be applied to a multitude of other sports articles or further objects for which an increased grip is desirable. For example, they may be applied to football panels, goal keeper gloves, grips of e.g. tennis rackets or golf clubs. The illustrated aspects may also be used for functional clothing in order to connect profile elements, e.g. for the purpose of increased grip, cushioning or stability etc., to a base layer.

FIGS. 1a-e show exemplary method steps for providing profile elements 150 that comprise a rubber material. As an example, in FIGS. 1a-e, a multitude of profile elements 150 are manufactured from three initial elements 120. In other examples, a different number of profile elements 150 may be manufactured from a larger or smaller number of initial elements 120. The profile elements 150 may be provided separately or they may also be connected. In an example, the profile elements 150 form a continuous web, a lattice and/or a honey comb structure that comprise holes in order to provide an improved flexibility, an increased breathability, and/or a reduced weight.

The initial elements 120 comprise a rubber material. The rubber material may be manufactured in a kneading process within a kneading machine. The duration of the kneading process may comprise 15-30 minutes, and may further comprise 20-25 minutes. The rubber material may be crystallized after the kneading and after adding sulfur, wherein a particular color may be added. The crystallization process may comprise 4-10 minutes, and may further comprise approximately 7 minutes. The rubber material may be, in addition, calendared. That way, the rubber material may be provided with a desired thickness. In some aspects, the rubber material may comprise other or further manufacturing steps and further additives.

In certain embodiments, the rubber material comprises a mixture of synthetic and natural rubber material. The rubber may further comprise a low density.

In other embodiments, the rubber material, after connecting to the base layer, comprises a Shore-A hardness in the range of 30-70, may further comprise a Shore-A hardness in the range of 40-60, and may still further comprise a Shore-A hardness of approximately 45 or 55.

Initially, the rubber material is cut into a predetermined shape for the initial elements 120. The predetermined shape may correspond to selected zones of the upper in which particular grip properties are desired and which, as an example, are described further below in connection with FIGS. 3a-b. The initial elements 120 are provided with a desired thickness. According to certain embodiments, the thickness is within the range of 0.3 mm and 2 mm, and may further be within the range of approximately 0.5 mm up to approximately 1.3 mm. Optionally, the thickness of one or more of the initial elements may vary. Therein, both the thickness within an initial element and the thickness of a first initial element as compared to a second initial element may vary.

As illustrated in FIG. 1a, the initial elements 120 are inserted into a lower mold 110, wherein the shape of the initial elements 120 and the shape of the lower mold 110 are adapted to each other.

Figure 1B:
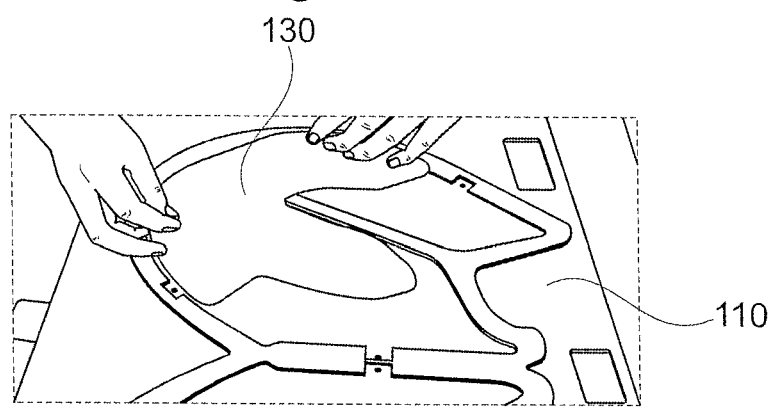

FIG. 1b shows that the upper face of the initial element 120 is, in certain embodiments, covered with a layer 130. The layer 130 may comprise nylon and/or other materials. The layer 130 may prevent the initial elements 120 from sticking to an upper plate 140.

Figure 1C:
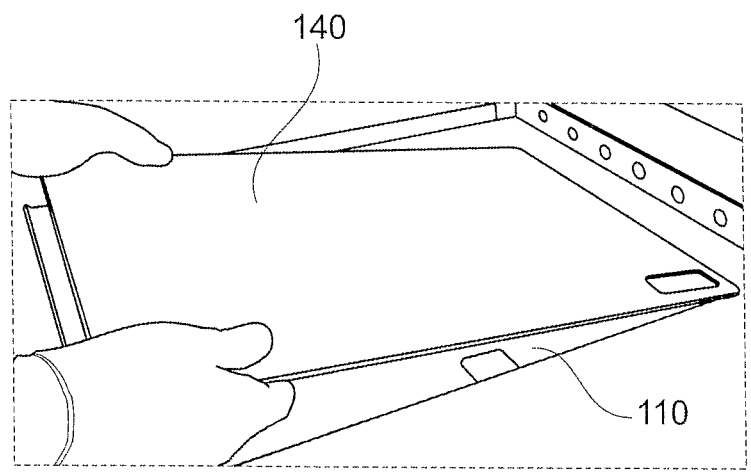

As shown in FIG. 1c, an upper plate 140 is then inserted onto the lower mold 110. The mold that comprises the lower mold 110 and the upper plate 140 is then closed. Optionally, the closed mold 110, 140 is pre-heated. The pre-heating may be carried out in the range of 100° C.-180° C., and may further be carried out in the range 145° C.-150° C. In some aspects, the pre-heating comprises a duration of 10-100 seconds, and may further comprise a duration of 25-35 seconds, and may still further comprise approximately 30 seconds.

Subsequently, the mold 110, 140 is subject to a pre-vulcanization process. Therein, the mold 110, 140, and thus the rubber material of the initial elements 120, is heated under pressure, wherein the rubber material pre-vulcanizes. The pre-vulcanization is carried out in the range of 100-180° C., and may further be carried out in the range of 145-150° C. Therein, in an example, a pressure that corresponds to a weight of 60-160 kg, and further a pressure that corresponds to a weight of 90-130 kg, and still further a pressure that corresponds to a weight of 110-120 kg, is applied to the mold. The pre-vulcanization, in an example, comprises 1-8 minutes, may further comprise 2-6 minutes, and may still further comprise approximately 3 minutes.

Figure 1D:
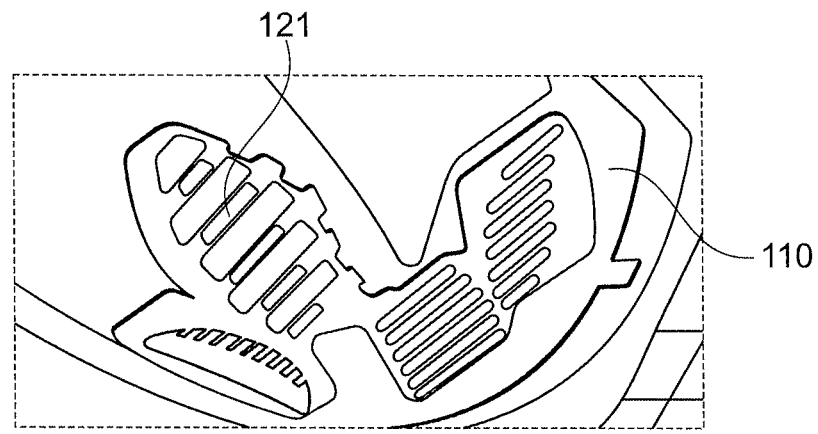

During the pre-vulcanization, the initial elements 120 are pressed into a predetermined shape. This shape, as well as the thickness of the initial elements 120, is determined by the profile of the lower mold 110. Also, several initial elements 120 may be connected, for example, to a continuous initial element 121 by means of the pre-vulcanization, as shown in FIG. 1d.

In the pre-vulcanization step, one or more profile elements may be die-cut into the one or more initial elements. The one or more initial elements may thus also provide several profile elements. For simplicity, the subsequent explanations relate to a continuous initial element 121 from which several profile elements are die-cut. However, this must not be considered as a restriction. Alternatively, several initial elements and/or only a single profile element may be present after the pre-vulcanization.

In a further step, the upper plate 140 is removed from the lower mold 110, i.e. the mold 110, 140 is opened, and the layer 130 is removed from the initial element 121. The pre-vulcanized surface of the initial element 121 is cleaned. This may comprise a cleaning with a solvent.

The initial element 121 may, in a further step, be cold pressed. In certain embodiments, the cold pressing is carried out within the mold 110, 140. The cold pressing may be carried out in a temperature range of 20° C.-70° C., and further in a temperature range of 40° C.-50° C. By means of this second pressing step, a particularly good material structure of the rubber material is created, which is well-suited for the subsequent connection to a base layer for an upper. In certain aspects, the pressure during the cold pressing corresponds to a weight of 5 kg/cm2-30 kg/cm2, may further correspond to a weight of 10 kg/cm2-20 kg/cm2, and may still further correspond to a weight of 15 kg/cm2.

In some embodiments, the upper face of the initial element 121 is roughened. Thus, the surface that may be used for the connection to a base layer 160 is maximized, and particularly strong connections may be achieved.

In a further step, the upper face of the initial element 121 is optionally wetted with a primer. The primer may be solvent-based but free of toluene and/or transparent. A suitable primer is for example D-Ply 007 F-2 of the company Dongsung. Optionally, a powder that comprises chlorine is applied to the surface. By means of the contact with chlorine, the primer is activated. Subsequently, the initial element 121 is heated. The heating may be carried out in the temperature range 40° C.-65° C., and further in the range 50-55° C. Moreover, the duration of the heating process may comprise 30-120 seconds, and may further comprise approximately 60 seconds.

In a further step, the upper face of the initial element 121 is cleaned. In particular, the dried powder is removed. The cleaning may comprise applying a solvent. In some embodiments, a gluing means is applied to the upper face of the initial element 121. In some aspects, the gluing means is transparent. In another aspect, the gluing means comprises a solvent and/or is free of toluene. A suitable gluing means comprises for example Bond Ace 6190 2-2 or 5190 S-2 of the company Dongsung. In some aspects, Unidure® 1001 may be added to the gluing means, with a ratio of 4-5%.

Figure 1E:
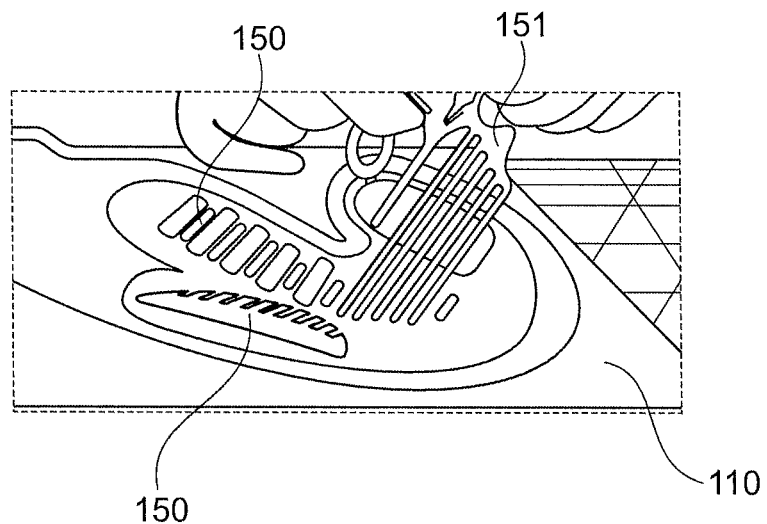

As shown in FIG. 1e, now the excess rubber material 151 of the initial element 121 is removed, which may be mainly arranged between the die-cut profile elements 150. At this point, the profile elements 150 are provided in their desired shape.

By applying the gluing means on the initial element 121 prior to removing the excess material, a more even coating of the profile elements 150 with the gluing means may be achieved such that an improved connection may be achieved.

The method is not limited to die-cutting several profile elements. Alternatively, only a single profile element may be die-cut. Also, one or more initial elements may be entirely used as one or more profile elements. The subsequent description is, for simplicity, based on several die-cut profile elements. However, this must not be considered as a restriction.

Figure 2A:
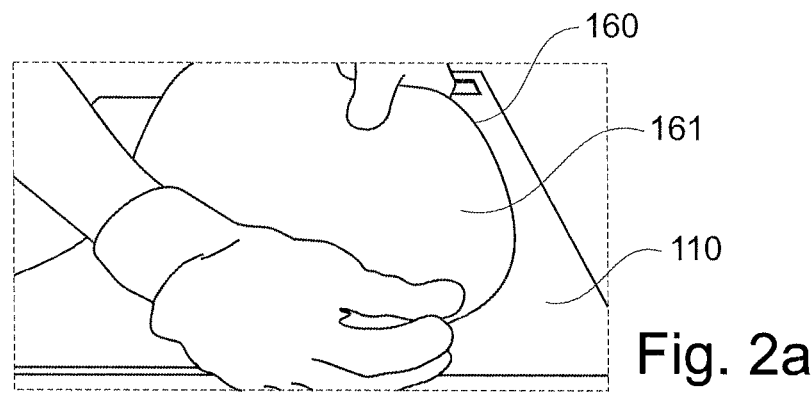
FIGS. 2a-d are perspective views illustrating a method of manufacturing an upper for a shoe according to certain embodiments of the present invention.

FIG. 2a shows the positioning of a base layer 160 for an upper on the profile elements 150. Therein, the base layer 160 may be inserted into the lower mold 110 where the prepared profile elements 150 are arranged. Thus, the profile elements 150 do not have to be removed from the lower mold 110, which would avoiding an additional manufacturing step and the possibility of disturbing their structure or their relative geometric arrangement with respect to each other. In addition, this feature also allows the process to be automated. In certain embodiments, the lower mold 110 and the shape of the base layer 160 are adapted to each other. For example, the base layer 160 may be fixed to the lower mold 110. Thus, a correct relative positioning of the base layer 160 and the profile elements 150 is ensured.

The base layer 160 may be provided for forming the outer face of an upper of a shoe and may be inserted into the lower mold 110 and on top of the profile elements 150, with its inner face 161 facing the top and with its outer face 162 facing the bottom. In an example, the base layer 160, in particular the outer face 162 of the base layer 160, comprises a synthetic material. In some embodiments, the base layer 160, in particular the outer face 162 of the base layer 160, comprises polyurethane. For example, the base layer 160, in particular the outer face 162 of the base layer 160, may comprise the material Hybrid Touch of the company Dongsung Co. Ltd.

Optionally, the base layer 160 comprises a sub-layer that is free from polyurethane. This sub-layer may be provided for forming the inner face 161 of the base layer 160. The sub-layer may comprise a fabric. For example, the sub-layer may be designed in a different manner for different types of shoes. It may provide different degrees of cushioning, a different thickness, and/or mass, or further different properties. The sub-layer may comprise several plies: plies which comprise microfibers and/or plies which comprise foam material and/or plies which provide a lining.

In some aspects, the sub-layer is already connected to the base layer 160 when the base layer 160 is inserted into the lower mold 110. In another aspect, a separate layer that is provided for the inner face of the upper may be inserted into the lower mold 110 on top of the inner face 161 of the base layer 160 and may be connected to the base layer 160 by means of the hot pressing, which is described further below.

Optionally, the primer may be applied to the outer face 162 of the base layer 160 prior to inserting the base layer 160 into the mold. To this end, for example the Bond Ace 232 HF-2D of the company Dongsung may be used.

In a further step, the lower mold 110 is closed by means of an upper mold. The shape of the upper mold and the shape of the base layer 160 may be adapted to each other. Subsequently, the closed mold that comprises the lower mold 110 and the upper mold is hot pressed. Therein, the closed mold and thus the profile element 150 and the base layer 160, as well as the optional gluing means, are heated under pressure.

In some embodiments, the hot pressing is carried out in a temperature and pressure range in which the rubber material of the profile elements 150 vulcanizes on the base layer. Thus, a permanent and reliable connection between the profile elements 150 and the base layer 160 is created, which is able to resist the large forces that occur in an upper for a football shoe. Hence, a sewing of the profile elements 150 is unnecessary. The optional gluing means may further improve the reliable connection. The final shape of the profile elements may be defined by the shape of the lower mold 110.

In certain embodiments, the profile elements 150 are connected to the outer face 162 of the base layer 160 without using a gluing means.

The thickness of a profile element may comprise approximately 0.3 mm up to approximately 2 mm, and may further comprise approximately 0.5 mm up to approximately 1.3 mm. In particular, the thickness of one or more profile elements may also vary. Therein, the thickness within a profile element and also the thickness of a first profile element with respect to a second profile element may vary. In some aspects, the profile element may also comprise one or more cuttings or recesses. These may deform during a contact with the ball, which may lead to an increase in the size of the contact area and may thus increase the grip between the profile element and, for example, a football. In particular, for those contacts with a ball that exhibit impacts with a large force, a particularly increased grip may be obtained.

In certain embodiments, the hot pressing is carried out in the range of 100° C.-180° C., and further in the range of 145° C.-150° C. Therein, in an example, a pressure that may correspond to a weight of 60-160 kg, may further correspond to a weight of 90-130 kg, and may still further correspond to a weight of 110-120 kg, is applied to the mold. The hot pressing, in an example, may comprise 10-70 seconds, may further comprise 20-50 seconds, and may still further comprise approximately 30 seconds.

It turns out that the connection between the base layer 160 and the profile elements 150 may be further improved by a cold pressing. A pressure that may correspond to a weight of 60-160 kg, and may further correspond to a weight of 90-130 kg, and may still further correspond to a weight of 110-120 kg, is applied to the closed mold. The speed of the cooling is controlled by means of the temperature of the cold pressing step. In certain embodiments, the cold pressing may be carried out in a temperature range of 10° C.-25° C., and may further be carried out at a temperature that is not more than 18° C. This leads to a faster cooling of the unit formed by the base layer 160, the profile elements 150 and optionally the gluing means after the vulcanization of the rubber material. By means of the cold pressing, moreover, the unit is cooled down under pressure. As a result, the cooling of the unit may thus be optimized and a particularly permanent connection between the profile elements 150 and the outer face 162 of the base layer 160 may be obtained.

Figure 2B:
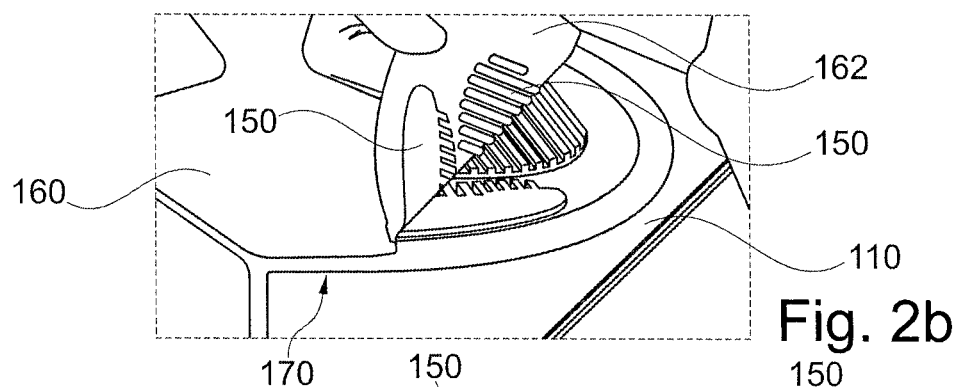

FIG. 2b shows the lower mold 110, which has been opened again. The base layer 160 is now firmly connected to the profile elements 150. The optional additional separate layer that was put onto the inner face 161 of the base layer is now also firmly connected to the base layer 160. Thus, an upper material 170 comprising the base layer 160, the profile elements 150, and optionally the additional fabric layer is provided. As shown in FIG. 2b, the upper material 170 is removed from the lower mold 110.

Figure 2C:
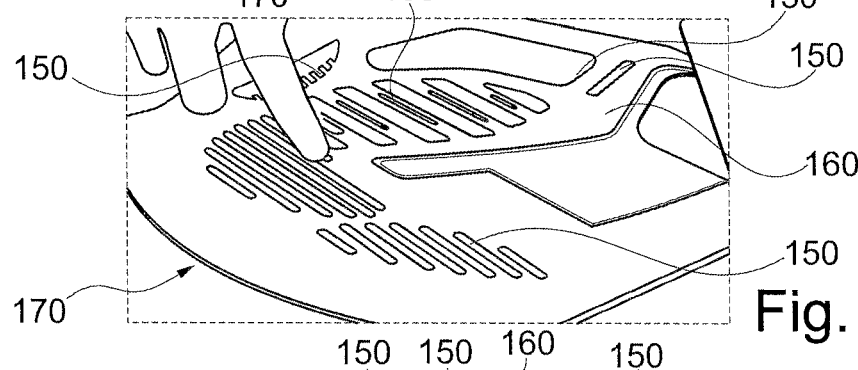

FIG. 2c shows the connected upper material 170. In a further step, the upper material 170 is cleaned. In some embodiments, water is used for cleaning. According to certain embodiments, no other solvents are used.

In a further step, the upper material 170 may be cut. For example, it may be cut such that it may be formed into an upper.

Both prior to the cutting and after the cutting, the upper material may be embossed. A specific partial area of the upper material is exposed to a pressure in the range of 40-120 psi, may further be exposed to a pressure in the range of 60-100 psi, and may still further be exposed to a pressure in the range of about 80 psi. In some embodiments, the embossing process comprises 1-10 seconds, and may further comprise about 4 seconds.

Figure 2D:
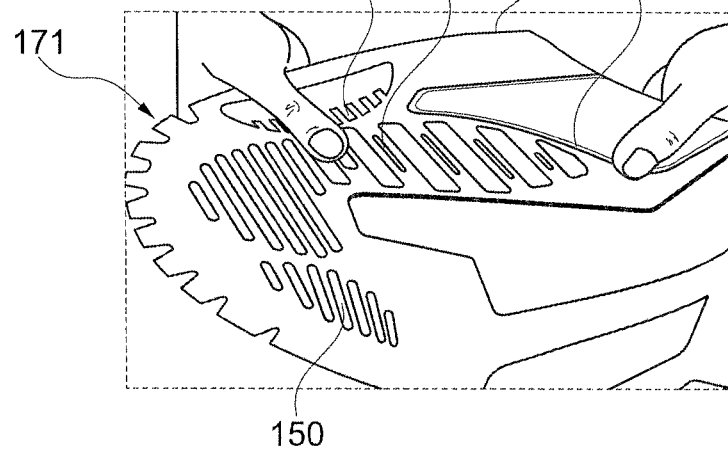

FIG. 2*d* shows the finished, cut and embossed upper material 171, which may be formed into an upper.

In some embodiments, a profile element, in at least one direction, comprises a width of less than 5 mm, may further comprise a width of less than 3 mm, and may still further comprise a width of less than 2 mm. By means of very small profile elements, local requirements in specific zones of an upper may be addressed very precisely. Smaller profile elements limit the flexibility of the upper to a smaller extent. Moreover, the profile elements may be arranged in a way such that the upper remains free along specific lines at which an increased flexibility is required. As a result, the possibility to connect particularly small profile elements to a base layer for an upper in a simple manner allows a plethora of design possibilities. In particular, by means of very small profile elements also a refined optical appearance may be obtained.

The explained steps may each be carried out manually or in an automated manner. Also a combination of manual and automated steps is possible. The sequence of the steps may in other examples be exchanged. Moreover, in other examples, the individual steps are only optional and may be left out.

By means of the described steps shoes in particular football shoes, an upper comprising profile elements which provide an improved grip may be manufactured in an efficient and automated process.

Figures 3A, 3B:
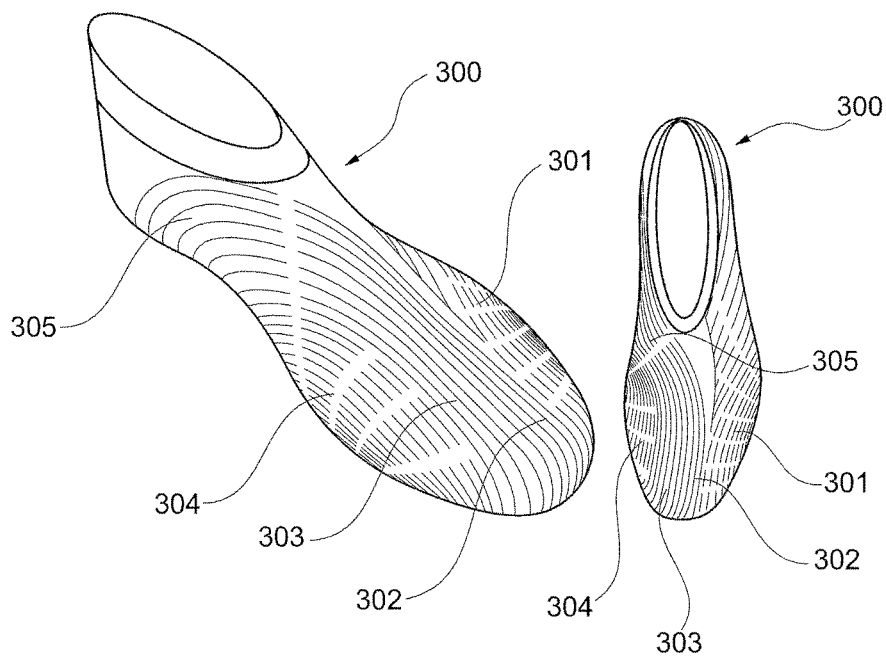
FIGS. 3a-b are perspective views of examples for dividing an upper for a shoe into zones with different requirements according to certain embodiments of the present invention.

FIGS. 3*a-b* show a model 300 for an upper for a football shoe comprising five different zones in which different properties of the upper are provided. In particular, different grip properties are provided in the zones. FIG. 3*a* shows a sideview of the model 300 whereas FIG. 3*b* shows a topview.

The zone 301 may be used for dribbling. There, accordingly, a large grip is desired. The zone 301 may be arranged in the lateral area of the phalanges and metatarsals. There, profile elements may for example be arranged in a dense manner such that the contact between the ball and the shoe is may be provided via the profile elements, which provide an increased grip.

The zone 302, by contrast, is usually used for stopping the ball, i.e. for the first contact with the ball. In certain embodiments, the zone 302 is arranged in the center above the phalanges and metatarsals. Therein, also an increased grip is desirable in this zone, but to a lesser extent than in zone 301. In addition, in this zone 302, a large cushioning is desirable in order to damp the ball when impacting the shoe. To this end, the profile element may be specifically designed as described with reference to FIG. 4 further below.

In the zones 303 and 304, which may be used for shots on goal and for long crosses, respectively, a similarly strong grip, as in zone 301, is desirable. The zones 303, 304 may be arranged medially in the area of the phalanges and metatarsals, wherein zone 304 is arranged slightly more medially. Within the zones 303, 304, the profile elements are also arranged with a large surface density in order to facilitate a large spin, for example for shots on goal and crosses.

The zone 305 may be arranged in the medial area of the ankle. However, in zone 305, an increased grip is typically not desired since zone 305 is usually used for straight passes without high risk. Accordingly, the profile elements may be arranged in this zone to a lesser extent or no profile elements may be arranged in zone 305 at all.

In other examples, more or less than five zones may be provided. In addition, the zones may also be arranged or designed differently.

Figure 4A:
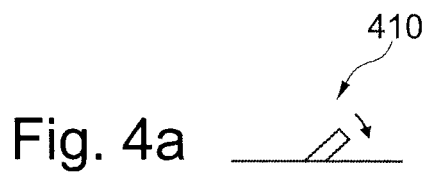
FIGS. 4a-i are perspective views illustrating examples of profile elements according to certain embodiments of the present invention.
Figure 4B:
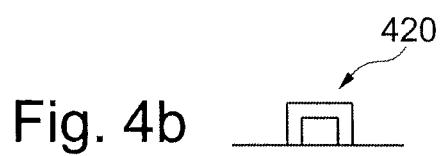
Figure 4C:
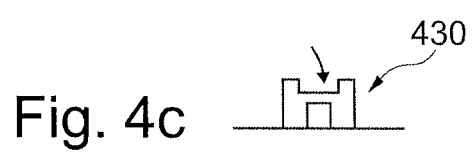
Figure 4I:
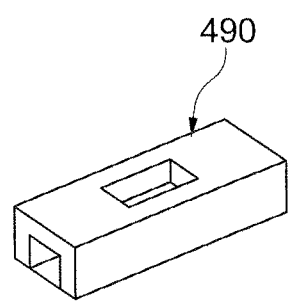
Figure 4D:
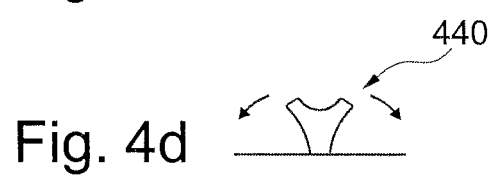
Figure 4E:
Figure 4F:
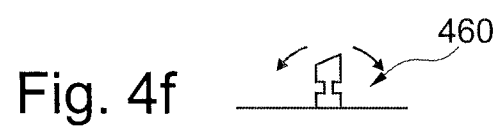
Figure 4G:
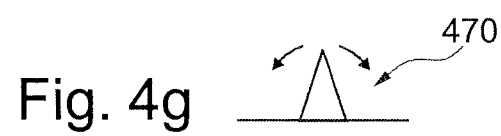
Figure 4H:
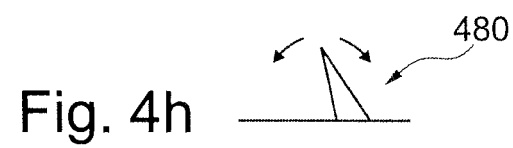

FIGS. 4*a-i* show different profiles 410 to 480, which may be used for other profile elements in various embodiments. Therein, two-dimensional cross sections through a profile which is arranged on a base layer are shown, respectively. FIG. 4*i* shows a perspective view of a three-dimensionally designed profile element 490.

The different profiles which are illustrated, on the one hand, provide contact areas of different sizes and thus different degrees of grip. Depending on the specific profile of the profile element, a differently large contact area with the impacting ball is created, and thus the ball will experience a different grip to the profile element. On the other hand, the different profiles are deformed into different directions and to different extents when the ball impacts on the profile elements. Thus, the design of the profile also influences the cushioning properties that are provided by the profile element.

By means of the different profiles, both different grip and different cushioning properties may be provided. Therein, the surfaces, the angles, and the heights of the respective profiles may be varied in a large parameter range such that an enormous design freedom is obtained.

In particular, also depending on the direction from which the ball impacts on the upper or in which the ball is kicked or passed, different properties of the profile elements may be obtained. For example, the profile 410 will deform differently depending on whether the ball impacts on the profile from the left side or from the right side. In particular, the contact area with the ball is maximized if the ball impacts the profile 410 laterally from the left side and presses it towards the base layer. Hence, this profile is for example useful in the zones 303 and 304, in which the ball often leaves the upper laterally at acute angles. By contrast, the profiles 420 and 430 offer a wider contact area with the ball towards the top. Thus, for example the profiles 420 and 430 are rather suited for situations in which the ball approximately impacts vertically. This is, for example, the case in the instep area, such as in zone 302. The profile 450 may for example provide a particularly large cushioning.

FIGS. 4*a-i* show a few illustrative examples. A multitude of other profiles may be conceived. By means of the described hot pressing method, these may be designed and combined in an almost arbitrary manner.

As a result, by means of the advantageous method for connecting profile elements with a base layer for an upper, the grip properties and also the cushioning properties of the upper may be designed in various ways.

In the following, further examples are described to facilitate the understanding of the invention:

1. Method for manufacturing an upper for a shoe, in particular a football shoe, comprising the steps of:
   a. providing a base layer (160) for an upper;
   b. connecting at least one profile element (150) which comprises a rubber material to the outer face (162) of the base layer (160);
   c. wherein the profile element (150) is connected to the outer face (162) of the base layer (160) without using a seam by means of hot pressing.
2. Method according to example 1, wherein the rubber material vulcanizes on the outer face (162) of the base layer (160) by means of the hot pressing.
3. Method according to example 1 or 2, wherein the outer face (162) of the base layer (160) comprises a synthetic material, in particular a polyurethane.
4. Method according to one of the preceding examples, wherein the rubber material comprises a Shore-A hardness in the range of 30-70, preferably in the range of 40-60, particularly, preferably of 45 or of 55.

5. Method according to one of the preceding examples, wherein the hot pressing is carried out in the range of 100° C.-180° C. preferably in the range of 145° C.-150° C.
6. Method according to one of the preceding examples, further comprising the step of pre-heating and/or pre-vulcanizing the profile element (150) prior to the connecting to the outer face (162) of the base layer (160).
7. Method according to one of the preceding examples, further comprising the step of roughening the surface of the profile element (150) prior to the connecting to the outer face (162) of the base layer (160).
8. Method according to one of the preceding examples, further comprising the step of coating the surface of the profile element (150) with a primer.
9. Method according to one of the preceding examples, further comprising the step of coating the surface of the profile element (150) with a gluing means.
10. Method according to one of the preceding examples, further comprising the step of cold pressing the base the layer (160) and the profile element (150) after the hot pressing.
11. Method according to one of the preceding examples, wherein the base layer (160) substantially comprises the entire upper of the shoe.
12. Method according to one of the preceding examples, wherein the outer face (162) of the base layer (160) is substantially provided for forming the outer face of the upper of the shoe.
13. Method according to one of the preceding examples, wherein the profile element (150) comprises a thickness of less than 1.5 mm.
14. Method according to one of the preceding examples, wherein the profile element (150), in at least one direction, comprises a width of less than 5 mm.
15. Upper for a shoe, in particular a football shoe, which is manufactured according to one of the methods of the preceding examples.
16. Shoe, in particular football shoe, comprising an upper according to example 15.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A method for manufacturing an upper for a shoe comprising the steps of:
   (a) inserting at least one profile element comprising a rubber material into a lower mold;
   (b) pre-vulcanizing the at least one profile element within the lower mold and forming the at least one profile element into a predetermined shape;
   (c) positioning a base layer for an upper within the lower mold;
   (d) hot pressing the at least one profile element to an outer face of the base layer within the lower mold without using a seam; and
   (e) shaping the base layer into a part of an upper for a shoe after hot pressing the at least one profile element.

2. The method according to claim 1, wherein the hot pressing further vulcanizes the rubber material on the outer face of the base layer.
3. The method according to claim 1, wherein the outer face of the base layer comprises a synthetic material.
4. The method according to claim 1, wherein the outer face of the base layer comprises polyurethane.
5. The method according to claim 1, wherein the rubber material comprises a Shore-A hardness in a range of 30-70.
6. The method according to claim 1, wherein the hot pressing is carried out in a range of 100° C.-180° C.
7. The method according to claim 1, further comprising a step of pre-heating the at least one profile element prior to pre-vulcanizing the at least one profile element.
8. The method according to claim 1, further comprising the step of roughening a surface of the at least one profile element prior to connecting to the outer face of the base layer.
9. The method according to claim 1, further comprising the step of coating a surface of the at least one profile element with a primer.
10. The method according to claim 1, further comprising the step of coating a surface of the at least one profile element with a glue.
11. The method according to claim 1, further comprising a step of cold pressing the base layer and the at least one profile element after the hot pressing.
12. The method according to claim 1, wherein substantially an entire upper of the shoe is formed by the base layer.
13. The method according to claim 1, wherein the outer face of the base layer is substantially provided for forming the outer face of the upper of the shoe.
14. The method according to claim 1, wherein the at least one profile element comprises a thickness of less than 1.5 mm.
15. The method according to claim 1, wherein the at least one profile element, in at least one direction, comprises a width of less than 5 mm.
16. A method for manufacturing an upper for a shoe comprising the steps of:
   (a) inserting at least one profile element comprising a rubber material into a lower mold;
   (b) pre-vulcanizing the at least one profile element within the lower mold and forming the at least one profile element into a predetermined shape;
   (c) coating a surface of the at least one profile element with a primer or a glue;
   (d) positioning a base layer for an upper within the lower mold after coating the surface of the at least one profile element;
   (e) hot pressing the at least one profile element to an outer face of the base layer within the lower mold without using a seam; and
   (f) shaping the base layer into a part of an upper for a shoe after hot pressing the at least one profile element.

17. The method according to claim 16, further comprising a step of cold pressing the base layer and the at least one profile element after the hot pressing.
18. A method for manufacturing an upper for a shoe comprising the steps of:
   (a) inserting at least one profile element comprising a rubber material into a lower mold;

(b) pre-vulcanizing the at least one profile element within the lower mold for a pre-vulcanizing time period and pressing the at least one profile element into a predetermined shape defined by the lower mold;
(c) cold pressing the at least one profile element within the lower mold after the pre-vulcanizing;
(d) positioning a base layer for an upper within the lower mold;
(e) hot pressing the at least one profile element to an outer face of the base layer within the lower mold for a hot pressing time period without using a seam, wherein the hot pressing time period is less than the pre-vulcanizing time period;
(e) cold pressing the base layer and the at least one profile element after the hot pressing within the lower mold; and
(f) shaping the base layer into a part of an upper for a shoe after cold pressing the base layer and the at least one profile element.

* * * * *